United States Patent
Ma et al.

(10) Patent No.: US 11,694,041 B2
(45) Date of Patent: Jul. 4, 2023

(54) CHAPTER-LEVEL TEXT TRANSLATION METHOD AND DEVICE

(71) Applicant: IFLYTEK CO., LTD., Anhui (CN)

(72) Inventors: Zhiqiang Ma, Anhui (CN); Junhua Liu, Anhui (CN); Si Wei, Anhui (CN); Guoping Hu, Anhui (CN)

(73) Assignee: IFLYTEK CO., LTD., Anhui (CN)

( * ) Notice: Subject to any disclaimer, the term of this patent is extended or adjusted under 35 U.S.C. 154(b) by 70 days.

(21) Appl. No.: 17/055,154

(22) PCT Filed: Apr. 10, 2019

(86) PCT No.: PCT/CN2019/082039
§ 371 (c)(1),
(2) Date: Nov. 13, 2020

(87) PCT Pub. No.: WO2019/218809
PCT Pub. Date: Nov. 21, 2019

(65) Prior Publication Data
US 2021/0150154 A1   May 20, 2021

(30) Foreign Application Priority Data
May 15, 2018 (CN) .......................... 201810463138.3

(51) Int. Cl.
*G06F 17/00*   (2019.01)
*G06F 40/47*   (2020.01)
(Continued)

(52) U.S. Cl.
CPC ............ *G06F 40/47* (2020.01); *G06F 40/126* (2020.01); *G06F 40/30* (2020.01); *G06F 40/40* (2020.01); *G06F 40/44* (2020.01)

(58) Field of Classification Search
CPC ........ G06F 40/00; G06F 40/30; G06F 40/126; G06F 40/10; G06F 40/263; G06F 40/279;
(Continued)

(56) References Cited

U.S. PATENT DOCUMENTS 9,053,090 B2    6/2015  Anisimovich et al.
2001/0047255 A1  11/2001 Fuji
(Continued)

FOREIGN PATENT DOCUMENTS

CN    101826072 A    9/2010
CN    105912533 A    8/2016
(Continued)

OTHER PUBLICATIONS

International Search Report issued in PCT/CN2019/082039 dated Jul. 17, 2019, 11 pages.
(Continued)

*Primary Examiner* — Michael Ortiz-Sanchez
(74) *Attorney, Agent, or Firm* — Zhong Law, LLC

(57) ABSTRACT

A discourse-level text translation method and device, the method comprising: acquiring a text to be translated, the text to be translated being a unit text in a discourse-level text to be translated (S101); acquiring an associated text of the text to be translated, the associated text including at least one of a preceding source text, a following source text, and a preceding target text (S102); and translating, according to the associated text, the text to be translated (S103).

18 Claims, 8 Drawing Sheets

(51) Int. Cl.
*G06F 40/126* (2020.01)
*G06F 40/30* (2020.01)
*G06F 40/40* (2020.01)
*G06F 40/44* (2020.01)

(58) Field of Classification Search
CPC ........ G06F 40/289; G06F 40/20; G06F 40/40;
G06F 40/51; G06F 40/42; G06F 40/44;
G06F 40/47; G06F 40/49; G06F 40/58;
G06F 40/45; G06F 40/12; G06F 40/53
See application file for complete search history.

(56) References Cited

U.S. PATENT DOCUMENTS

| | | | | |
|---|---|---|---|---|
| 2003/0191626 | A1* | 10/2003 | Al-Onaizan | G06F 40/295 704/8 |
| 2008/0162114 | A1* | 7/2008 | Torres-Rocca | G06F 40/47 704/7 |
| 2010/0223047 | A1 | 9/2010 | Christ | |
| 2017/0060855 | A1* | 3/2017 | Song | G06F 40/55 |
| 2018/0052829 | A1 | 2/2018 | Lee | |
| 2018/0060727 | A1 | 3/2018 | Rainwater | |
| 2018/0075022 | A1 | 3/2018 | Xue et al. | |
| 2018/0101522 | A1 | 4/2018 | Fujiwara et al. | |
| 2018/0121423 | A1 | 5/2018 | Orsini et al. | |
| 2019/0114545 | A1* | 4/2019 | Lee | G06N 3/08 |
| 2019/0129947 | A1* | 5/2019 | Shin | G10L 25/30 |
| 2020/0034435 | A1* | 1/2020 | Norouzi | G06N 3/0454 |
| 2020/0066262 | A1* | 2/2020 | Shu | G10L 15/197 |
| 2020/0226328 | A1 | 7/2020 | Tu et al. | |

FOREIGN PATENT DOCUMENTS

| | | |
|---|---|---|
| CN | 106126507 A | 11/2016 |
| CN | 106484681 A | 3/2017 |
| CN | 107368476 A | 11/2017 |
| CN | 107818086 A | 3/2018 |
| CN | 107943794 A | 4/2018 |
| JP | H09146950 A | 6/1997 |
| KR | 1020180019342 A | 2/2018 |
| RU | 2518946 C1 | 6/2014 |
| RU | 172882 U1 | 7/2017 |
| RU | 2628202 C1 | 8/2017 |
| WO | 2006133571 A1 | 12/2006 |
| WO | 2014098640 A1 | 6/2014 |
| WO | 2018058046 A1 | 3/2018 |

OTHER PUBLICATIONS

Liu Dongni, "Combination and Application of Text Type and Translation Method" Liaoning University of international Business and Economics, 2012, pp. 1-4.
Husin et al., "Syntactic Rule-Based Approach for Extracting Concepts from Quranic Translation Text", IEEE, 2017 pp. 1-6.
Russian Office Action issued in 2020139212/28(072809) dated Jun. 18, 2021, 11 pages.
Japanese Office Action issued in JP 2020-563948 dated Apr. 5, 2022, 10 pages.
Extended European Search Report issued in 19804567.6 dated Jan. 27, 2022, 7 pages.
Tiedemann et al., "Neural Machine Translation with Extended Context," arXiv:1708.05943v1, Aug. 2017, pp. 1-11.
Australian Office Action issued in 2019270109 dated Sep. 30, 2021, 7 pages.
Wu et al., "Google's Neural Machine Translation System: Bridging the Gap between Human and Machine Translation," arxiv.org/pdf/1609.081442016, 2016, 1-23.
Zhang et al., "A Context-Aware Recurrent Encoder for Neural Machine Translation," IEEE/ACM Transactions on Audio, Speech, and Language Processing, vol. 25, No. 12, 2017, pp. 2424-2432.
Bawden et al., "Evaluating Discourse Phenomena in Neural Machine Translation," arxiv.org/pdf/1711.00513, 2018, 10 pages.
Bosselut et al., "Discourse-Aware Neural Rewards for Coherent Text Generation," arxiv.org/pdf/1805.03766, 2018, 12 pages.
New Zealand Office Action issued in 770794 dated Oct. 1, 2021, 5 pages.
Korean Office Action issued in 10-2020-7035704 dated Aug. 24, 2022, 8 pages.

* cited by examiner

CHAPTER-LEVEL TEXT TRANSLATION METHOD AND DEVICE

The present application is the U.S. national phase of International Application No. PCT/CN2019/082039, titled "CHAPTER-LEVEL TEXT TRANSLATION METHOD AND DEVICE", filed on Apr. 10, 2019, which claims the priority to Chinese Patent Application No. 201810463138.3, titled "DISCOURSE-LEVEL TEXT TRANSLATION METHOD AND APPARATUS", filed on May 15, 2018, with the China National Intellectual Property Administration, both of which are incorporated herein by reference in their entirety.

TECHNICAL FIELD

The present disclosure relates to the technical field of text translation, and in particular to a method and apparatus for translating a discourse-level text.

BACKGROUND

A discourse-level text is composed of a sequence of sentences. For example, a discourse-level text can be a speech text, a magazine article, a literary work, etc. Since the most important feature of discourse-level texts is the cohesiveness and continuity between sentences, the level text is not only a collection of a sequence of sentences, but also a semantic unity with complete structures and clear functions. For level texts, methods for translating discourse-level texts should be applied to translate them. Among the existing discourse-level text translation methods, generally the to-be-translated discourse-level text as a whole is directly translated by treating it as a translation object. However, the resulting translation is not ideal in the sense that the accuracy of the translation result is not high, thereby negatively impacting the user experience.

SUMMARY

An object of embodiments in this disclosure is to provide a method and apparatus for translating a discourse-level text, which improves the accuracy of translation result when translating the discourse-level text.

A method for translating a discourse-level text is provided according to embodiments in this disclosure. The method includes:

obtaining a text to be translated, where the text to be translated is a unit text in the discourse-level text to be translated;

obtaining relevant text of the text to be translated, where the relevant text includes at least one of preceding source text, succeeding source text, and preceding target text, where the preceding source text refers to at least one unit of text before the text to be translated in the discourse-level text, the succeeding source text refers to at least one unit of text after the text to be translated in the discourse-level text, and the preceding target text refers to translated text of the preceding source text; and translating the text to be translated according to the relevant text.

Optionally, translating the text to be translated according to the relevant text includes:

translating the text to be translated according to the relevant text by using a pre-constructed encoding-and-decoding model.

Optionally, translating the text to be translated according to the relevant text includes:

obtaining an initial encoded result by encoding the text to be translated, where the initial encoded result represents semantic information of the text to be translated;

obtaining a relevant encoded result by encoding the relevant text, where the relevant encoded result represents semantic information of the relevant text;

obtaining a target encoded result by processing the initial encoded result with all or part of encoded results in the relevant encoded result, where the target encoded result represents the semantic information of the text to be translated and carries all or part of the semantic information of the relevant text; and translating the text to be translated by decoding the target encoded result.

Optionally, obtaining the initial encoded result by encoding the text to be translated includes:

obtaining the initial encoded result by encoding words of the text to be translated.

Accordingly, obtaining the relevant encoded result by encoding the relevant text includes:

encoding words of each text unit in the relevant text to obtain encoded results corresponding to respective text units, and determining the encoded results as the relevant encoded result.

Optionally, after encoding the words of the text to be translated, the method further includes:

obtaining an accumulative result corresponding to the text to be translated by adding encoded results of the words of the text to be translated together.

Accordingly, after encoding the words of each text unit in the relevant text, the method further includes:

adding, in a case that the relevant text includes the preceding source text, encoded results of words of each unit of text in the preceding source text together, to obtain an accumulative result corresponding to each unit of text;

adding, in a case that the relevant text includes the succeeding source text, encoded results of words of each unit of text in the succeeding source text together, to obtain an accumulative result corresponding to each unit of text; and adding, in a case that the relevant text includes the preceding target text, encoded results of words of each unit of text in the preceding target text together, to obtain an accumulative result corresponding to each unit of text.

Optionally, processing the initial encoded result with all or part of the encoded results in the relevant encoded result includes:

determining, in a case that the relevant text includes the preceding source text, an encoded result of the preceding source text from the relevant encoded result;

determining, in a case that the relevant text includes the succeeding source text, an encoded result of the succeeding source text from the relevant encoded result; and processing the initial encoded result according to the determined encoded result.

Optionally, processing the initial encoded result according to the determined encoded result includes:

determining, in a case that the relevant text includes the preceding source text, a correlation degree between the text to be translated and the preceding source text according to the initial encoded result of the text to be translated and the encoded result of the preceding source text;

determining, in a case that the relevant text includes the succeeding source text, a correlation degree between the text to be translated and the succeeding source text according to the initial encoded result of the text to be translated and the encoded result of the succeeding source text; and processing the initial encoded result according to the determined encoded result and the determined correlation degrees.

Optionally, translating the text to be translated by decoding the target encoded result includes:

decoding, in a case that the relevant text includes the preceding target text, the target encoded result by using an encoded result of the preceding target text in the relevant encoded result.

Optionally, decoding the target encoded result by using the encoded result of the preceding target text in the relevant encoded result includes:

determining a correlation degree between the text to be translated and the preceding target text; and decoding the target encoded result according to the determined correlation degree and the encoded result of the preceding target text.

Optionally, determining the correlation degree between the text to be translated and the preceding target text includes:

determining the correlation degree between the text to be translated and the preceding source text as the correlation degree between the text to be translated and the preceding target text.

An apparatus for translating a discourse-level text is provided according to embodiments of this disclosure. The apparatus includes:

a to-be-translated text obtaining unit, configured to obtain text to be translated, where the text to be translated is unit text in the discourse-level text to be translated;

a relevant text obtaining unit, configured to obtain relevant text of the text to be translated, where the relevant text includes at least one of preceding source text, succeeding source text, and preceding target text, the preceding source text refers to at least one unit of text before the text to be translated in the discourse-level text, the succeeding source text refers to at least one unit of text after the text to be translated in the discourse-level text, and the preceding target text refers to translated text of the preceding source text; and a to-be-translated text translation unit, configured to translate the text to be translated according to the relevant text.

Optionally, the to-be-translated text translation unit is configured to translate the text to be translated according to the relevant text by using a pre-constructed encoding-and-decoding model.

Optionally, the to-be-translated text translation unit includes:

a first encoding subunit, configured to obtain an initial encoded result by encoding the text to be translated, where the initial encoded result represents semantic information of the text to be translated;

a second encoding subunit, configured to obtain a relevant encoded result by encoding the relevant text, where the relevant encoded result represents semantic information of the relevant text;

a result processing subunit, configured to obtain a target encoded result by processing the initial encoded result with all or part of encoded results in the relevant encoded result, where the target encoded result represents the semantic information of the text to be translated and carries all or part of the semantic information of the relevant text; and a decoding implementation subunit, configured to translate the text to be translated by decoding the target encoded result.

Optionally, the decoding implementation subunit is configured to decode, in a case that the relevant text includes the preceding target text, the target encoded result by using an encoded result of the preceding target text in the relevant encoded result.

An apparatus for translating a discourse-level text is provided according to embodiments in this disclosure. The apparatus includes a processor, a memory, and a system bus, where the processor and the memory are connected with each other by the system bus, and the memory is configured to store one or more programs, the one or more programs including instructions that, when executed by the processor, cause the processor to execute any of the above methods for translating a discourse-level text.

A computer-readable storage medium is provided according to embodiments of this disclosure. The computer-readable storage medium includes instructions that, when executed on a computer, cause the computer to execute any of the above methods for translating a discourse-level text.

A computer program product is provided according to embodiments of this disclosure, where the computer program product, when executed on a terminal device, causes the terminal device to execute any of the above methods for translating a discourse-level text.

With the method and apparatus for translating a discourse-level text according to the embodiments, each text unit in the to-be-translated discourse-level text is taken as text to be translated, then relevant text of the text to be translated is obtained from the discourse-level text and the text to be translated is translated based on the relevant text. It can be seen that when translating the text to be translated, not only the current context of the text to be translated but the content of the relevant text of the text to be translated are considered, which can improve the accuracy of the translation result of the text to be translated, thereby enhancing the user experience.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

Figure 1:
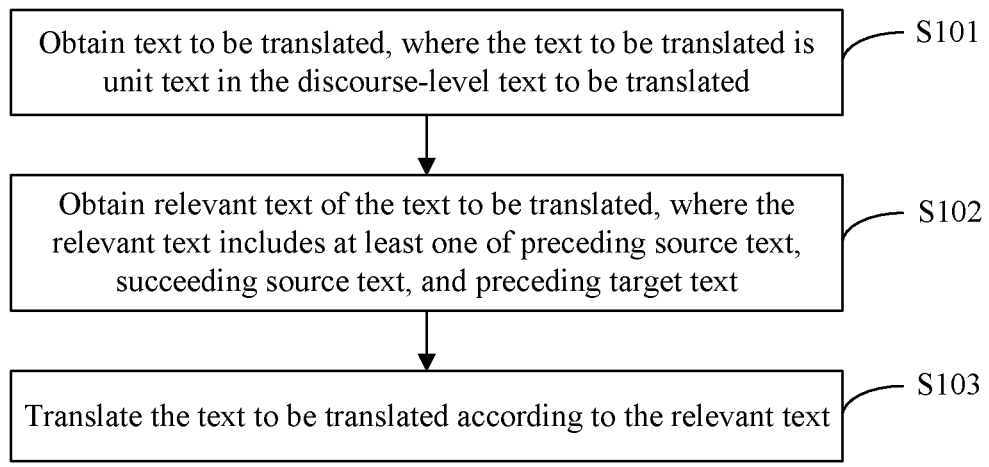
FIG. 1 shows a flow chart of a method for translating a discourse-level text according to an embodiment of the present disclosure.

In some discourse-level text translation methods, the whole discourse-level text to be translated can be regarded as an object of translation, which can be directly translated by a translation model. However, if each sentence of the discourse-level text is translated by using these methods, the contextual information of the translated sentence will not be considered, which reduces the accuracy of the translation result and further negatively impacts the user experience. In addition, when the sentence is translated, there may be redundant information in the information received by the translation model. Specifically, if sentences before the sentence to be translated or sentences after the sentence to be translated are irrelevant to the sentence to be translated, then when the whole discourse-level text is taken as the object of translation, for the translated sentence, the irrelevant sentences before or after it are the redundant information.

In order to resolve the above-mentioned deficiencies, a discourse-level text translation method is provided according to the embodiments of the present disclosure. For each section of text to be translated in a discourse-level text, the text being a sentence for example, when translating the text to be translated, not only the current context of the text to be translated but also the contextual information of the text to be translated are considered, which improves the accuracy of the translation result of the text to be translated and thereby enhances the user experience. Further, when translating the text to be translated, the contextual information is dynamically selected according to the relevance of the text to be translated to the contextual information in the embodiments of the present disclosure, which not only reduces the redundant information in the received information of the translation model, but further improves the accuracy of the translation result of the text to be translated. Furthermore, when translating the text to be translated, a translation result of text preceding the text to be translated is also considered in the embodiments of the present disclosure, which enables the translation result of the text to be translated to connect with the translation result of the preceding text. In this way, not only is the translation result of the text to be translated more accurate, but also the fluency of the entire translated text can be improved. That is, the cohesiveness and continuity between sentences of the translated discourse-level text are ensured.

The technical solutions in the embodiments of the present disclosure will be described clearly and completely in conjunction with the accompanying drawings in the embodiments of the present disclosure in order to make the objects, technical solutions, and advantages of the embodiments of the present disclosure clearer. Apparently, the described embodiments are some rather than all of the embodiments of the present disclosure. All other embodiments obtained by those of ordinary skill in the art based on the embodiments of the present disclosure without any creative work shall fall within the protection scope of the present disclosure.

First Embodiment

Reference is made to FIG. 1, which shows a flow chart of a method for translating a discourse-level text according to an embodiment of the present disclosure. The method includes the following steps S101 to S103.

In step S101, text to be translated is obtained, where the text to be translated is unit text in the discourse-level text to be translated.

The discourse-level text to be translated, that is, the discourse-level text before translation, will be referred to as discourse-level text hereinafter for simplicity. The embodiment does not limit the text type of the discourse-level text. For example, the discourse-level text may be a speech script, a magazine article, or a literary work, etc.

A discourse-level text is a collection of a sequence of sentences. When translating a discourse-level text, the translation may be performed in the unit of sentence or any other text length in sequence in the embodiment. Assuming that the translation is performed in the unit of sentence, each sentence can be obtained according to the sequence of sentences in the discourse-level text. A currently obtained sentence is determined as the text to be translated, and is translated according to the subsequent steps.

It should be noted that languages of the discourse-level text before and after the translation are not limited in this embodiment. For example, the language before translation may be Chinese and the language after translation may be English.

In step S102, relevant text of the text to be translated is obtained, where the relevant text includes at least one of preceding source text, succeeding source text, and preceding target text.

In this embodiment, the preceding source text refers to at least one unit of text before the text to be translated in the discourse-level text, the succeeding source text refers to at least one unit of text after the text to be translated in the discourse-level text, and the preceding target text refers to translated text of the preceding source text.

Specifically, assuming that the translation is performed in the unit of sentence, one or more sentences preceding the text to be translated can be obtained from the discourse-level text as the preceding source text. One or more sentences succeeding the text to be translated can be obtained from the discourse-level text as the succeeding source text. In addition, since each sentence in the discourse-level text is translated in sequence, the preceding source text has been translated when translating the text to be translated. Thus, the translated text of the preceding source text, that is, the preceding target text, can be obtained directly.

It should be noted that the numbers of sentences in the preceding source text and the succeeding source text may be same or different. When k sentences preceding the text to be translated are determined as the preceding source text, k sentences or l sentences succeeding the text to be translated may be determined as the succeeding source text, where k, l are integers, $k \neq l$, $k \geq 1$, $l \geq 1$.

Figure 2:
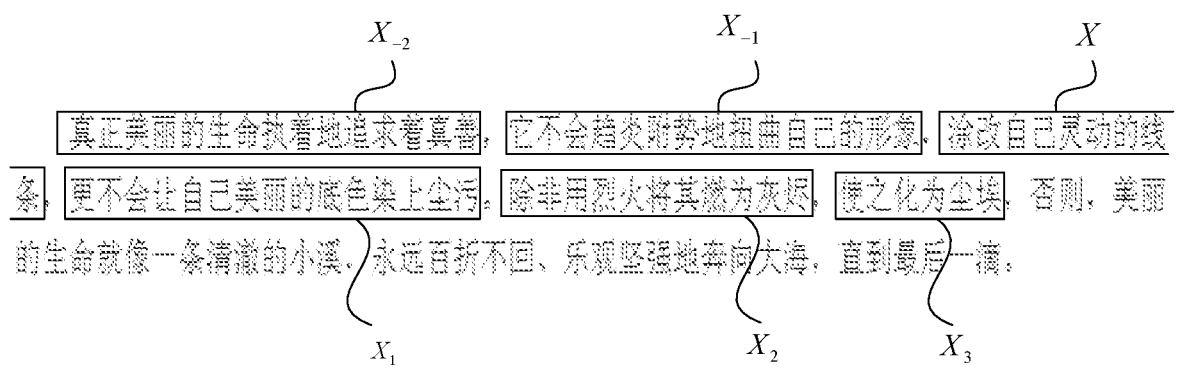
FIG. 2 shows a schematic diagram of a discourse-level text according to an embodiment of the present disclosure.

For example, in the discourse-level text shown in FIG. 2, the text to be translated is referred to as X, the sentence $X_{-1}$ preceding X may be determined as the preceding source text, or multiple sentences preceding X may be determined as the preceding source text, such as the sentence $X_{-1}$ and the sentence $X_{-2}$. Similarly, the sentence X, succeeding X may be determined as the succeeding source text, or multiple sentences preceding X may be determined as the succeeding source text, such as sentence $X_1$, sentence $X_2$, and sentence $X_3$.

In step 103, the text to be translated is translated according to the relevant text.

The relevant text of the text to be translated may be considered in this embodiment when translating the text to be translated. That is, semantic information of at least one of the preceding source text, the succeeding source text, and the preceding target text of the text to be translated is considered in order to translate the text to be translated, so as to obtain the translation result of the text to be translated. In addition, a degree of correlation between the text to be translated and the preceding source text, a degree of correlation between the text to be translated and the succeeding source text, and a degree of correlation between the text to be translated and the preceding target text may also be considered. It can be seen that by consideration into semantic content of the text to be translated and the relevant text and the degree of correlation between the text to be translated and the relevant text, the translation result of the text to be translated can be more accurate.

It should be noted that when the relevant text includes the preceding target text (the translation result of the preceding source text), that is, when the preceding target text is used to assist in translation of the text to be translated, not only is the accuracy of the translation result of the text to be translated improved, but the translation result of the text to be translated can connect with the translation result of the preceding source text. That is, the translation result of the text to be translated can better connect with the translation result of the preceding text in semantics, thereby ensuring the cohesiveness and continuity between the sentences of the translated discourse-level text.

It should further be noted that reference can be made to the second embodiment for the specific implementation of step S103.

In summary, a method for translating a discourse-level text is provided according to the embodiment, where each text unit in the to-be-translated discourse-level text is taken as text to be translated, then relevant text of the text to be translated is obtained from the discourse-level text and the text to be translated is translated based on the relevant text. It can be seen that when translating the text to be translated, not only the current context of the text to be translated but the content of the relevant text of the text to be translated are considered, which can improve the accuracy of the translation result of the text to be translated, thereby enhancing the user experience.

Second Embodiment

The specific implementation of the step S103 in the first embodiment is introduced in this embodiment.

In the embodiment, an encoding-and-decoding model can be constructed in advance as a translation model for discourse-level texts, that is, the encoding-and-decoding model implements the translation of the discourse-level text by means of encoding and subsequent decoding. Based on this, the above step S103 may specifically include translating the text to be translated according to the relevant text by using a pre-constructed encoding-and-decoding model.

It should be noted that, in the following, how to use an encoding-and-decoding model to translate the text to be translated is introduced in conjunction with FIG. 3, which shows a topological structural schematic diagram of an encoding-and-decoding model.

Figure 3:
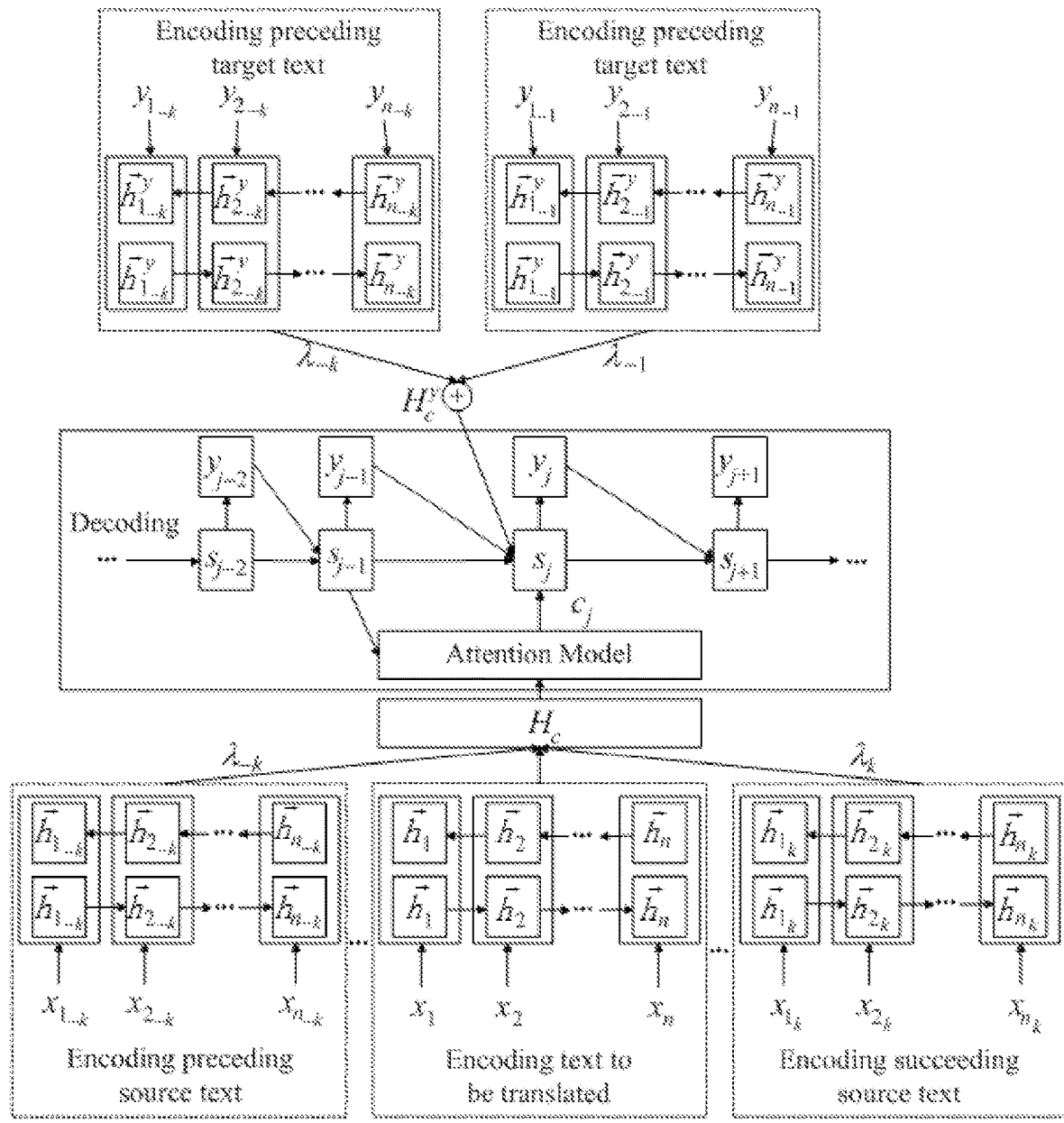
FIG. 3 shows a topological structural schematic diagram of an encoding-and-decoding model according to an embodiment of the present disclosure.

In order to facilitate the introduction in conjunction with FIG. 3, the translation is performed here in the unit of sentence, with k sentences preceding the text to be translated as the preceding source text and k sentences succeeding the text to be translated as the succeeding source text. First, the following is defined.

1. The discourse-level text before translation is represented by $\{X_{-k}, \ldots, X_{-1}, X, X_1, \ldots X_k\}$, where X represents the text to be translated, $X_{-1} \ldots X_{-k}$ sequentially represent the $1^{st}$ sentence before X, ..., the $k^{th}$ sentence before X; $X_1 \ldots X_k$ sequentially represent the $1^{st}$ sentence after X, ..., the $k^{th}$ sentence after X. Here, $X_{-1} \ldots X_{-k}$ are collectively determined as the preceding source text, and $X_1 \ldots X_k$ are collectively determined as the succeeding source text.

For simplicity of description, it is assumed that each sentence includes n words (in practice, the actual number of words shall prevail). As shown in FIG. 3, all words in the text X to be translated are represented by $\{x_1, x_2, \ldots, x_n\}$, where $x_1, x_2, \ldots, x_n$ sequentially represent the $1^{st}$ word, $2^{nd}$ word ... $n^{th}$ word of the text X to be translated. Similarly, all words in the sentence $X_{-k}$ in the preceding source text are represented by $\{x_{1_{-k}}, x_{2_{-k}}, \ldots, x_{n_{-k}}\}$, where $X_{1_{-k}}, x_{2_{-k}}, \ldots, x_{n_{-k}}$ sequentially represent the $1^{st}$ word, $2^{nd}$ word ... $n^{th}$ word of the sentence $X_{-k}$; other sentences in the preceding source text are represented in a similar way. All words in the sentence $X_k$ in the succeeding source text are represented by $\{x_{1_k}, x_{2_k}, \ldots, x_{n_k}\}$, where $x_{1_k}, x_{2_k}, \ldots, x_{n_k}$ sequentially represent the $1^{st}$ word, $2^{nd}$ word ... $n^{th}$ word of the sentence $X_k$; other sentences in the succeeding source text are represented in a similar way.

2. The discourse-level text after translation is represented by $\{Y_{-k}, \ldots, Y_{-1}, Y, Y_1, \ldots Y_k\}$, where Y represents translated text of the text X to be translated, $Y_{-1} \ldots Y_{-k}$ sequentially represent translated text of $X_{-1} \ldots X_{-k}$ in the preceding source text, and $Y_1 \ldots Y_k$ sequentially represent translated text of $X_1 \ldots X_k$ in the succeeding source text. Here, $Y_{-1} \ldots Y_{-k}$ are collectively determined as the preceding target text.

All words in the translated text Y of the text X to be translated are represented by $\{y_1, y_2, \ldots, y_n\}$, where $y_1, y_2, \ldots, y_n$ sequentially represent the $1^{st}$ word, $2^{nd}$ word ... $n^{th}$ word of Y. As shown in FIG. 3, all words in the sentence $Y_{-k}$ in the preceding target text are represented by $\{y_{1_{-k}}, y_{2_{-k}}, \ldots, y_{n_{-k}}\}$, where $y_{1_{-k}}, y_{2_{-k}}, \ldots, y_{n_{-k}}$ sequentially represent the $1^{st}$ word, $2^{nd}$ word ... $n^{th}$ word of the sentence $Y_{-k}$. All words in the sentence $Y_{-1}$ in the preceding target text are represented by $\{y_{1_{-1}}, y_{2_{-1}}, \ldots, y_{n_{-1}}\}$, where $y_{1_{-1}}, y_{2_{-1}}, \ldots, y_{n_{-1}}$ sequentially represent the $1^{st}$ word, $2^{nd}$ word ... $n^{th}$ word of the sentence $Y_{-1}$. Other sentences in the preceding target text are represented in a similar way.

In conjunction with FIG. 3, how to use the encoding-and-decoding model to translate the text to be translated is described in the following.

Figure 4:
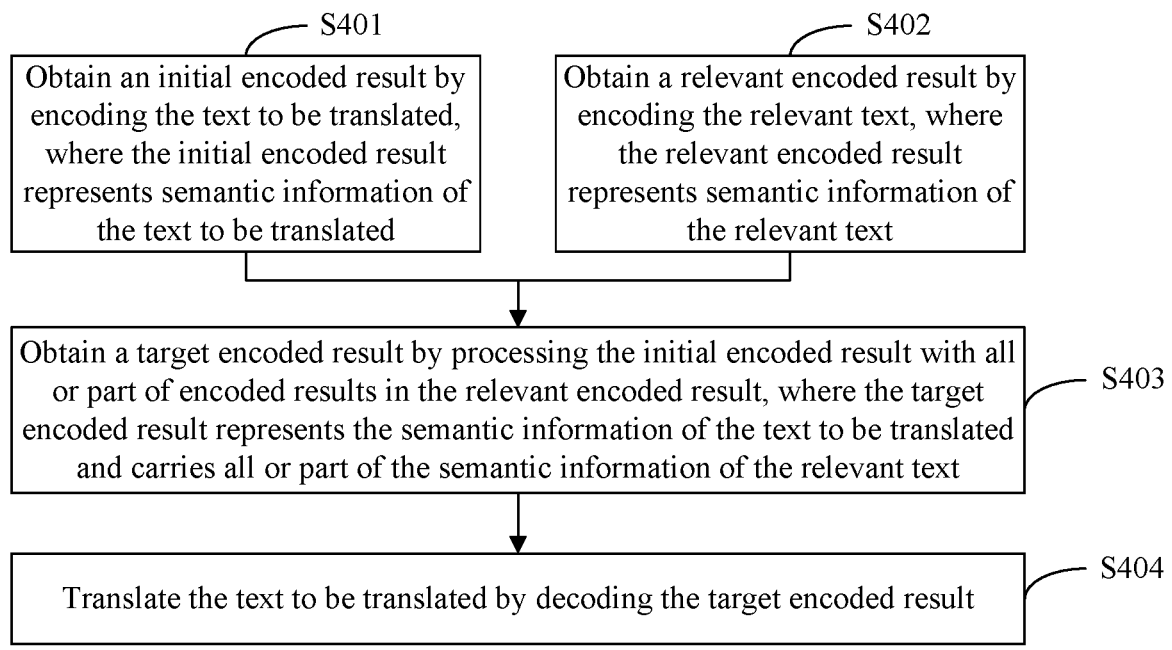
FIG. 4 shows a flow chart of translation by using a pre-constructed encoding-and-decoding model according to an embodiment of the present disclosure.

FIG. 4 is a flow chart of translation by using the pre-constructed encoding-and-decoding model, which may specifically include the following steps S401 to S404 in an implementation of this embodiment.

In step S401, an initial encoded result is obtained by encoding the text to be translated, where the initial encoded result represents semantic information of the text to be translated.

In an implementation, the step S401 may specifically include obtaining the initial encoded result by encoding the text to be translated with a bidirectional recurrent neural network (Recurrent Neural Network, abbreviated as RNN).

In the step S401 or specific implementations of the step S401, when encoding the text to be translated, the initial encoded result may specifically be obtained by encoding all words of the text to be translated.

Specifically, as shown in FIG. 3, the words of the text X to be translated, namely $\{x_1, x_2, \ldots, x_n\}$, are inputted into the bidirectional RNN in a form of word vector. Existing or future methods can be used for the vectorization of the words in this embodiment.

The calculation formula for each hidden state in the bidirectional RNN is as follows:

$$h_i = f(W\vec{x}_i + Uh_{i-1}) \quad (1)$$

where i=1, 2, . . . , n, f is a non-linear function, e.g., sigmoid function or long short-term memory (Long Short-Term Memory, abbreviated as LSTM) network, W and U are training parameters of the bidirectional RNN, $\vec{x}_i$ represents a word vector of word $x_i$, $h_{i-1}$ represents an $(i-1)^{th}$ hidden state, which is used to represent semantic information of the word $x_{i-1}$ and $h_i$ represents an $i^{th}$ hidden state, which is used to represent the semantic information of the word $x_i$.

The bidirectional RNN includes a forward RNN and a backward RNN. The forward RNN generates a forward hidden sequence $\vec{H}$ after reading in order the word vector of the words in the text X to be translated, where $\vec{H} = \{\vec{h}_1, \vec{h}_2, \ldots \vec{h}_k\}$ and represents forward information of the text X to be translated; the backward RNN generates a backward hidden sequence $\overleftarrow{H}$ after reading in reverse order the word vector of the words in the text X to be translated, where $\overleftarrow{H} = \{\overleftarrow{h}_1, \overleftarrow{h}_2, \ldots \overleftarrow{h}_n\}$ and represents backward information of the text X to be translated.

Hidden state units whose positions in the forward hidden sequence $\vec{H}$ and the backward hidden sequence $\overleftarrow{H}$ correspond to each other are spliced together to form a state sequence corresponding to the word at that position. That is, state sequences corresponding to the words in $\{x_1, x_2, \ldots, x_n\}$ are as follows: the state sequence corresponding to $x_1$ is $h_1 = [\vec{h}_1; \overleftarrow{h}_1]$, the state sequence corresponding to $x_2$ is $h_2 = [\vec{h}_2; \overleftarrow{h}_2], \ldots$, and the state sequence corresponding to $x_n$ is $h_n = [\vec{h}_n; \overleftarrow{h}_n]$. Based on this, the semantic information of the text X to be translated can be represented by $H = \{h_1, h_2, \ldots, h_n\}$, and H is the initial encoded result obtained by encoding the text to be translated.

Further, in an implementation, after encoding the words of the text to be translated, the method may further include obtaining an accumulative result corresponding to the text to be translated by adding encoded results of the words of the text to be translated together. In this implementation, after the encoded result H is obtained, an accumulative result $\tilde{H}$ obtained by adding the state sequences in H together can be determined to be an new initial encoded result, to represent the semantic information of the text X to be translated, $$\tilde{H} = \sum_{i=1}^{n} h_i = h_1 + h_2 + \ldots + h_n$$

In step S402, a relevant encoded result is obtained by encoding the relevant text, where the relevant encoded result represents semantic information of the relevant text.

In an implementation, the step S402 may specifically include obtaining the relevant encoded result by encoding the relevant text with a bidirectional RNN.

In the step S402 or specific implementations of the step S402, when encoding the relevant text, specifically, words of each text unit in the relevant text may be encoded, to obtain encoded results corresponding to respective text units, and these encoded results are determined as the relevant encoded result.

Specifically, as shown in FIG. 3, when the relevant text includes the preceding source text, that is, the relevant text includes K sentences $X_{-1} \ldots X_{-k}$ before the text X to be translated, $X_{-1} \ldots X_{-k}$ can be encoded in such a way as similar to encoding of the text X to be translated in step S401, where it is only needed to replace the text X to be translated separately with $X_{-1}, \ldots X_{-k}$, so that the semantic information of sentence $X_{-1}$ is represented by $H_{-1} = \{h_{1_{-1}}, h_{2_{-1}}, \ldots, h_{n_{-1}}\}, \ldots$, the semantic information of sentence $X_{-k}$ is represented by $H_{-k} = \{h_{1_{-k}}, h_{2_{-k}}, \ldots h_{k_{-k}}\}$, and $H_{-1}, \ldots, H_{-k}$ is an encoded result obtained by encoding the preceding source text, where in $H_{-1} = \{h_{1_{-1}}, h_{2_{-1}}, \ldots, h_{n_{-1}}\}$, $h_{1_{-1}} = [\vec{h}_{1_{-1}}; \overleftarrow{h}_{1_{-1}}], h_{2_{-1}} = [\vec{h}_{2_{-1}}; \overleftarrow{h}_{2_{-1}}], \ldots, h_{n_{-1}} = [\vec{h}_{n_{-1}}; \overleftarrow{h}_{n_{-1}}]$, and in $H_{-k} = \{h_{1_{-k}}, h_{2_{-k}}, \ldots, h_{n_{-k}}\}$, $h_{1_{-k}} = [\vec{h}_{1_{-k}}; \overleftarrow{h}_{1_{-k}}], h_{2_{-k}} = [\vec{h}_{2_{-k}}; \overleftarrow{h}_{2_{-k}}], \ldots, h_{n_{-k}} = [\vec{h}_{n_{-k}}; \overleftarrow{h}_{n_{-k}}]$.

When the relevant text includes the succeeding source text, that is, the relevant text includes K sentences $X_1, \ldots X_k$ after the text X to be translated, $X_1, \ldots X_k$ can be encoded in such a way as similar to encoding of the text X to be translated in step S401, where it is only needed to replace the text X to be translated separately with $X_1, \ldots X_k$, so that the semantic information of sentence X, is represented by $H_1 = \{h_{1_1}, h_{2_1}, \ldots, h_{n_1}\}, \ldots$, the semantic information of sentence $X_k$ is represented by $H_k = \{h_{1_k}, h_{2_k}, \ldots, h_{n_k}\}$, and $H_1, \ldots, H_k$ is an encoded result obtained by encoding the succeeding source text, where in $H_1 = \{h_{1_1}, h_{2_1}, \ldots, h_{n_1}\}$, $h_{1_1} = [\vec{h}_{1_1}; \overleftarrow{h}_{1_1}], \ldots, h_{n_1} = [\vec{h}_{2_1}; \overleftarrow{h}_{2_1}], \ldots, h_{n_1} = [\vec{h}_{n_1}; \overleftarrow{h}_{n_1}]$, and in $H_k = \{h_{1_k}, h_{2_k}, \ldots, h_{n_k}\}$, $h_{1_k} = [\vec{h}_{1_k}; \overleftarrow{h}_{1_k}], h_{2_k} = [\vec{h}_{2_k}; \overleftarrow{h}_{2_k}], \ldots, h_{n_k} = [\vec{h}_{n_k}; \overleftarrow{h}_{n_k}]$.

When the relevant text includes the preceding target text, that is, the relevant text includes translated text $Y_{-1}, \ldots Y_{-k}$ of K sentences $X_{-1} \ldots X_{-k}$ before the text X to be translated, $Y_{-1} \ldots Y_{-k}$ can be encoded in such a way as similar to encoding of the text X to be translated in step S401, where it is only needed to replace the text X to be translated separately with $Y_{-1}, \ldots Y_{-k}$, so that the semantic information of sentence Y, is represented by $H_{-1}{}^y = \{h_{1_{-1}}{}^y, h_{2_{-1}}{}^y, \ldots h_{n_{-1}}{}^y\}, \ldots$, the semantic information of sentence $Y_{-k}$ is represented by $H_{-k}{}^y = \{h_{1_{-k}}{}^y, h_{2_{-k}}{}^y, \ldots h_{n_{-k}}{}^y\}$, and $H_{-1}{}^y, \ldots, H_{-k}{}^y$ is an encoded result obtained by encoding the preceding target text, where in $H_{-1}{}^y = \{h_{1_{-1}}{}^y, h_{2_{-1}}{}^y, h_{n_{-1}}{}^y\}$, $h_{1_{-1}}{}^y = [\vec{h}_{1_{-1}}{}^y; \overleftarrow{h}_{1_{-1}}{}^y], h_{2_{-1}}{}^y = [\vec{h}_{2_{-1}}{}^y; \overleftarrow{h}_{2_{-1}}{}^y], \ldots, h_{n_{-1}}{}^y = [\vec{h}_{n_{-1}}{}^y; \overleftarrow{h}_{n_{-1}}{}^y]$, and in $H_{-k}{}^y = \{h_{1_{-k}}{}^y, h_{2_{-k}}{}^y, \ldots h_{n_{-k}}{}^y\}, h_{1_{-k}}{}^y = [\vec{h}_{1_{-k}}{}^y; \overleftarrow{h}_{1_{-k}}{}^y], h_{2_{-k}}{}^y = [\vec{h}_{2_{-k}}{}^y; \overleftarrow{h}_{2_{-k}}{}^y], \ldots, h_{n_{-k}}{}^y = [\vec{h}_{n_{-k}}{}^y; \overleftarrow{h}_{n_{-k}}{}^y]$.

Further, in an implementation, after encoding the words of each text unit in the relevant text, the method may further include steps A1 to C1.

In step A1, in a case that the relevant text includes the preceding source text, encoded results of words of each unit of text in the preceding source text are added together, to obtain an accumulative result corresponding to each unit of text.

After obtaining the encoded results $H_{-1}, \ldots, H_{-k}$ of the preceding source text, an accumulative result of all the state sequences in $H_{-1}$ can be used to represent the semantic information of sentence $X_{-1}$, an accumulative result $H_{-k}$ of all the state sequences in $H_{-k}$ can be used to represent the semantic information of sentence $X_{-k}$, and $\tilde{H}_{-1}, \ldots, \tilde{H}_{-k}$ are collectively determined as an encoded result of the preceding source text, $$\text{where } \tilde{H}_{-1} = \sum_{i=1}^{n} h_{i_{-1}} = h_{1_{-1}} + h_{2_{-1}} + \ldots + h_{n_{-1}};$$

$$\ldots;$$

$$\tilde{H}_{-k} = \sum_{i=1}^{n} h_{i_{-k}} = h_{1_{-k}} + h_{2_{-k}} + \ldots + h_{n_{-k}}.$$

In step B1, in a case that the relevant text includes the succeeding source text, encoded results of words of each unit of text in the succeeding source text are added together, to obtain an accumulative result corresponding to each unit of text.

After obtaining the encoded results $H_1, \ldots, H_k$ of the succeeding source text, an accumulative result $\tilde{H}_1$ of all the state sequences in $H_1$ can be used to represent the semantic information of sentence $X_1$, an accumulative result $\tilde{H}_k$ of all the state sequences in $H_k$ can be used to represent the semantic information of sentence $X_k$, and $\tilde{H}_1, \ldots, \tilde{H}_k$ are collectively determined as an encoded result of the succeeding source text, $$\text{where } \tilde{H}_1 = \sum_{i=1}^{n} h_{i_1} = h_{1_1} + h_{2_1} + \ldots + h_{n_1};$$

$$\ldots;$$

$$\tilde{H}_k = \sum_{i=1}^{n} h_{i_k} = h_{1_k} + h_{2_k} + \ldots + h_{n_k}.$$

In step C1, in a case that the relevant text includes the preceding target text, encoded results of words of each unit of text in the preceding target text are added together, to obtain an accumulative result corresponding to each unit of text.

After obtaining the encoded results $H_{-1}^y, \ldots, H_{-k}^y$ of the preceding source text, an accumulative result $\tilde{H}_1^y$ of all the state sequences in $H_{-1}^y$ can be used to represent the semantic information of sentence $Y_{-1}$, an accumulative result $\tilde{H}_{-k}^y$ of all the state sequences in $H_{-k}^y$ can be used to represent the semantic information of sentence $Y_{-k}$, and $\tilde{H}_1^y, \ldots, \tilde{H}_{-k}^y$ are collectively determined as an encoded result of the preceding target text, $$\text{where } \tilde{H}_{-1}^y = \sum_{i=1}^{n} h_{i_{-1}}^y = h_{1_{-1}}^y + h_{2_{-1}}^y + \ldots + h_{n_{-1}}^y;$$

$$\ldots;$$

$$\tilde{H}_{-k}^y = \sum_{i=1}^{n} h_{i_{-k}}^y = h_{1_{-k}}^y + h_{2_{-k}}^y + \ldots + h_{n_{-k}}^y.$$

It should be noted that the execution order of steps S401 and S402 is not limited in this embodiment. S401 and S402 may be executed simultaneously, step S401 may be executed before execution of step S402, or step S402 may be executed before execution of step S401.

In step S403, a target encoded result is obtained by processing the initial encoded result with all or some of the encoded results in the relevant encoded result, where the target encoded result represents the semantic information of the text to be translated and carries all or part of the semantic information of the relevant text.

In this embodiment, one or more encoded results of the encoded result $H_{-1}, \ldots, H_{-k}$ of the preceding source text, the encoded result $H_1, \ldots, H_k$ of the succeeding source text and the encoded result $H_{-1}^y, \ldots, H_{-k}^y$ of the preceding target text may be used to process the initial encoded result H of the text to be translated, and the processed encoded result is determined as the target encoded result.

Alternatively, one or more encoded results of the encoded result $\tilde{H}_{-1}, \ldots, \tilde{H}_{-k}$ of the preceding source text, the encoded result $\tilde{H}_1, \ldots, \tilde{H}_k$ of the succeeding source text and the encoded result $\tilde{H}_1^y, \ldots, \tilde{H}_{-k}^y$ of the preceding target text may be used to process the initial encoded result H of the text to be translated, and the processed encoded result is determined as the target encoded result $H_c$.

It should be noted that when processing the initial encoded result, semantic information of text units in the relevant text can be selected by different degree values according to a correlation degree between the text to be translated and the relevant text, so that the target encoded result can carry the semantics information with different degrees and represent semantic information H, of the text to be translated.

It should further be noted that reference can be made to the third embodiment for the specific implementation of step S403.

In step S404, the text to be translated is translated by decoding the target encoded result.

When decoding the target encoded result $H_c$, existing decoding method, such as one with an attention model (as shown in FIG. 3), or future decoding methods can be used for decoding the target encoded result H, so as to obtain the translation result of the text to be translated.

It should further be noted that reference can be made to the fourth embodiment for the specific implementation of step S404

In summary, this embodiment uses the encoding-and-decoding model to encode and decode the text to be translated and the relevant text. When the text to be translated is translated through the encoding-and-decoding method, not only the current context of the text to be translated is considered, but the relevant text of the text to be translated is also considered. Thus, the accuracy of the translation result of the text to be translated is improved, thereby improving the user experience.

Third Embodiment

The specific implementation of the step S403 in the second embodiment is introduced in this embodiment.

Figure 5:
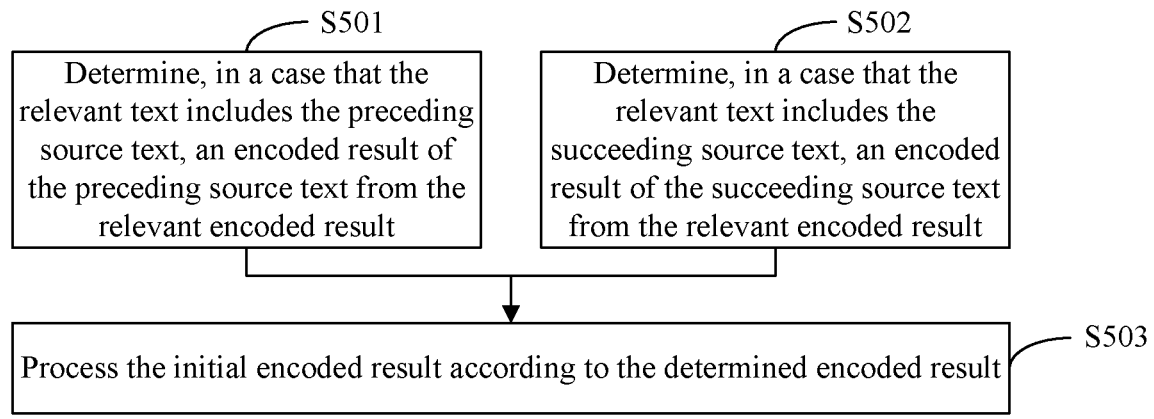
FIG. 5 shows a flow chart of processing an initial encoded result according to an embodiment of the present disclosure.

Reference is made to FIG. 5, which shows a flow chart of processing an initial encoded result. "Processing the initial encoded result with all or some of the encoded results in the relevant encoded result" in the above step S403 further includes the following steps S501 to S503.

In step S501, in a case that the relevant text includes the preceding source text, the encoded result of the preceding source text is determined from the relevant encoded result.

In this embodiment, the encoded result of the preceding source text may be $H_{-1}, \ldots, H_{-k}$ or $\tilde{H}_{-1}, \ldots, \tilde{H}_{-k}$ in the second embodiment.

In step S502, in a case that the relevant text includes the succeeding source text, the encoded result of the succeeding source text is determined from the relevant encoded result.

In this embodiment, if the encoded result of the preceding source text is $H_{-1}, \ldots, H_{-k}$, the encoded result of the succeeding source text may be $H_1, \ldots, H_k$ in the second embodiment; similarly, if the encoded result of the preceding source text is $\tilde{H}_{-1}, \ldots, \tilde{H}_{-k}$, the encoded result of the succeeding source text may be $\tilde{H}_1, \ldots, \tilde{H}_k$ in the second embodiment.

In step S503, the initial encoded result is processed according to the determined encoded result.

In an implementation, the step S503 specifically includes the following steps A2 to C2.

In step A2, in a case that the relevant text includes the preceding source text, a correlation degree between the text to be translated and the preceding source text is determined according to the initial encoded result of the text to be translated and the encoded result of the preceding source text.

The relevance between the text to be translated and each sentence in the preceding source text (hereinafter referred to as preceding sentence) is uncertain, and a preceding sentence is redundant with respect to the text to be translated if the text to be translated is completely irrelevant to the preceding sentence. If the text to be translated is translated with reference to the preceding sentence, the accuracy of the translation result of the text to be translated will be negatively affected, which means that the accuracy of the translation result will be reduced. Therefore, in order to reasonably utilize the encoded result of the preceding source text, a correlation degree between the text to be translated and each preceding sentence may be separately determined in this embodiment, so that semantic information corresponding to the preceding sentence can be dynamically utilized with reference to a determined result of the correlation degree, to avoid the information redundancy caused by the preceding sentence.

In this step, the initial encoded result of the text to be translated may be $\tilde{H}$ and encoded results of the preceding sentences in the preceding source text may respectively be $\tilde{H}_{-1}, \ldots, \tilde{H}_{-k}$. A neural network structure Gate Network may be used to generate a correlation coefficient corresponding to each preceding sentence, the correlation coefficient representing a correlation degree between the text to be translated and a corresponding preceding sentence.

Figure 6:
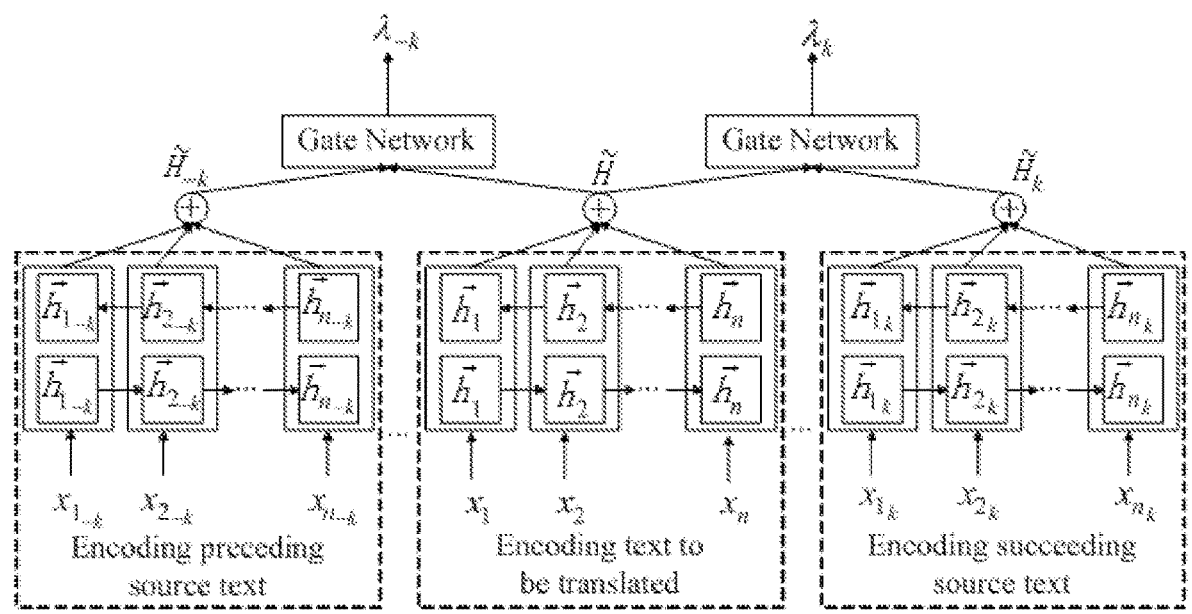
FIG. 6 shows a network structural schematic diagram of Gate Network according to an embodiment of the present disclosure.

Reference is made to FIG. 6, which is a network structural schematic diagram of Gate Network. In specific implementations, the initial encoded result $\tilde{H}$ of the text to be translated and the encoded results $\tilde{H}_{-1}, \ldots, \tilde{H}_{-k}$ corresponding to respective preceding sentences are used as the input of the Gate Network. Then, Gate Network calculates the correlation coefficient corresponding to each preceding sentence according to the following calculation formula:

$$\lambda_{-i} = \text{sigmoid}(U\tilde{H} + V\tilde{H}_{-i}) \qquad (2)$$

where i=1, 2 ... k; $\tilde{H}$ is the initial encoded result of the text to be translated; $\tilde{H}_{-i}$ is an encoded result of an $i^{th}$ sentence preceding the text to be translated; $\lambda_{-i}$ is a correlation coefficient of the $i^{th}$ sentence preceding the text to be translated, which represents a correlation degree between the text to be translated and the $i^{th}$ sentence preceding the text to be translated; U and V are training parameters of the Gate Network, which are obtained by training large amount of data collected in advance and both have a dimension of d×1.

It should be noted that $\tilde{H}$ and $\tilde{H}_{-1}$, are matrices with a dimension of 1×d, where d is the number of hidden nodes in the encoding process by the bidirectional RNN and is configured in advance. Thus, a scalar with a dimension of 1 can be obtained through matrix multiplication indicated in formula (2), and then transformed by a non-linear function, i.e., the sigmoid function, to obtain a scalar $\lambda_{-i}$ which falls in the range from 0 to 1. The larger $\lambda_{-i}$ is, the higher the correlation degree between the text to be translated and the $i^{th}$ sentence preceding the text to be translated is, and vice versa.

It can be seen that correlation coefficients $\{\lambda_{-k}, \lambda_{-k-1}, \ldots, \lambda_{-1}\}$ corresponding to respective preceding sentences in the preceding source text can be calculated by formula (2).

In step B2, in a case that the relevant text includes the succeeding source text, a correlation degree between the text to be translated and the succeeding source text is determined according to the initial encoded result of the text to be translated and the encoded result of the succeeding source text.

The relevance between the text to be translated and each sentence in the succeeding source text (hereinafter referred to as succeeding sentence) is uncertain, and a succeeding sentence is redundant with respect to the text to be translated if the text to be translated is completely irrelevant to the succeeding sentence. If the text to be translated is translated with reference to the succeeding sentence, the accuracy of the translation result of the text to be translated will be negatively affected, which means that the accuracy of the translation result will be reduced. Therefore, in order to reasonably utilize the encoded result of the succeeding source text, a correlation degree between the text to be translated and each succeeding sentence may be separately determined in this embodiment, so that semantic information corresponding to the succeeding sentence can be dynamically utilized with reference to a determination result of the correlation degree, to avoid the information redundancy caused by the succeeding sentence.

In this step, the initial encoded result of the text to be translated may be H and encoded results of the succeeding sentence in the succeeding source text may respectively be $\tilde{H}_1, \ldots, \tilde{H}_k$. The neural network structure Gate Network may be used to generate a correlation coefficient corresponding to each succeeding sentence, the correlation coefficient representing a correlation degree between the text to be translated and a corresponding succeeding sentence.

Reference is made to FIG. 6, which is a network structural schematic diagram of Gate Network. In specific implementations, the initial encoded result $\tilde{H}$ of the text to be translated and the encoded results $\tilde{H}_1, \ldots, \tilde{H}_k$ corresponding to respective succeeding sentences are used as the input of the Gate Network. Then, Gate Network calculates the correlation coefficient corresponding to each succeeding sentence according to the following calculation formula:

$$\lambda_i = \text{sigmoid}(U\tilde{H} + V\tilde{H}_i) \qquad (3)$$

where i=1, 2 ... k; $\tilde{H}$ is the initial encoded result of the text to be translated; $\tilde{H}_i$ is an encoded result of an $i^{th}$ sentence succeeding the text to be translated; $\lambda_i$ is a correlation coefficient of the $i^{th}$ sentence succeeding the text to be translated, which represents a correlation degree between the text to be translated and the $i^{th}$ sentence succeeding the text to be translated; U and V are training parameters of the Gate Network, which are obtained by training large amount of data collected in advance and both have a dimension of d×1.

It should be noted that $\tilde{H}$ and $\tilde{H}_i$ are matrices with a dimension of 1×d, where d is the number of hidden nodes in the encoding process by the bidirectional RNN and is configured in advance. Thus, a scalar with a dimension of 1 can be obtained through matrix multiplication indicated in formula (3), and then transformed by a non-linear function, i.e., the sigmoid function, to obtain a scalar $\lambda_i$ which falls in the range from 0 to 1 The larger $\lambda_i$ is, the higher the correlation degree between the text to be translated and the $i^{th}$ sentence succeeding the text to be translated is, and vice versa.

It can be seen that correlation coefficients $\{\lambda_1, \lambda_2, \ldots, \lambda_k\}$ of respective succeeding sentences in the succeeding source text can be calculated by formula (3).

In step C2, the initial encoded result is processed according to the determined encoded result and the determined correlation degree.

After the correlation coefficients $\{\lambda_{-k}, \lambda_{-k-1}, \ldots, \lambda_{-1}\}$ corresponding to respective preceding sentences in the preceding source text are calculated, preceding sentences can be dynamically selected according to these correlation coefficients; similarly, after the correlation coefficients $\{\lambda_1, \lambda_2, \ldots, \lambda_k\}$ corresponding to respective succeeding sentences in the succeeding source text are calculated, succeeding sentences can be dynamically selected based on these correlation coefficients. The specific process is as follows.

Based on the initial encoded result $H=\{h_1, h_2, \ldots, h_n\}$ of the text to be translated, which is obtained in the step S401 in the second embodiment, contextual information can be introduced for a corresponding $h_i$ ($i=1, 2 \ldots n$) of each word in the text to be translated according to the following calculation formula:

$$h'_i = h_i + \lambda_{-k}\tilde{H}_{-k} + \ldots + \lambda_{-1}\tilde{H}_{-1} + \lambda_1\tilde{H}_1 + \ldots + \lambda_k\tilde{H}_k \quad (4)$$

where $\{\lambda_{-k}, \lambda_{-k-1}, \ldots, \lambda_{-1}\}$ are the correlation coefficients corresponding to the respective preceding sentences obtained through Gate Network, $\{\lambda_1, \lambda_2, \ldots, \lambda_k\}$ are the correlation coefficients corresponding to respective succeeding sentences obtained through Gate Network, $\tilde{H}_{-1}, \ldots, \tilde{H}_{-k}$ are the encoded results of respective preceding sentences, and $\tilde{H}_1, \ldots, \tilde{H}_k$ are the encoded results of respective succeeding sentences.

It can be seen that context information can be separately introduced for each word in the text to be translated through formula (4). Through the above encoding process, the semantic information of the text to be translated is transformed to $H_c = \{h'_1, h'_2, \ldots, h'_n\}$, that is, the output $H_c$ of the encoding part as shown in FIG. 3.

It should be noted that $H_c$ not only includes the semantic information of the text to be translated, but also utilizes $\{\lambda_{-k}, \lambda_{-k-1}, \ldots, \lambda_{-1}\}$, $\{\lambda_1, \lambda_2, \ldots, \lambda_k\}$ to dynamically select contextual information for use, which not only avoids information redundancy caused by information superimposition, but also improves the accuracy of the translation result.

In summary, the encoding method according to this embodiment introduces all or part of the semantic information in the relevant text at the encoding end and further the information about correlation degrees between the text to be translated and the introduced relevant text. In this way, the contextual information of the text to be translated can be dynamically selected, which not only reduces the redundant information in the received information of the encoding-and-decoding model, but also further improves the accuracy of the translation result of the text to be translated.

Fourth Embodiment

The specific implementation of the step S404 in the second embodiment is introduced in this embodiment.

In this embodiment, "the text to be translated is translated by decoding the target encoded result" in the above step S404 specifically includes decoding, in a case that the relevant text includes the preceding target text, the target encoded result by using an encoded result of the preceding target text in the relevant encoded result. The encoded result of the preceding target text may be $H_{-1}^y, \ldots, H_{-k}^y$ or $\tilde{H}_1^y, \ldots, \tilde{H}_{-k}^y$ in the step S402 in the second embodiment. These encoded results can be utilized to assist in decoding the target encoded result $H_c$ so as to obtain the translation of the text to be translated.

In an implementation of this embodiment, decoding the target encoded result by using the encoded result of the preceding target text in the relevant encoded result may include the following steps A3 and B3.

In step A3, a correlation degree between the text to be translated and the preceding target text is determined.

The preceding target text includes a translation result of each preceding sentence in the preceding source text (hereinafter referred to as translated sentences). A correlation degree between each translated sentence and the text to be translated can be separately determined.

In an implementation, the step A3 may specifically include determining the correlation degrees between the text to be translated and the preceding source text as the correlation degrees between the text to be translated and the preceding target text. In this implementation, correlation degrees between the text to be translated and respective translated sentences in the preceding target text may be respectively represented by the correlation coefficients $\{\lambda_{-k}, \lambda_{-k-1}, \ldots, \lambda_{-1}\}$ respectively corresponding to the preceding sentences in the preceding source text calculated in step A2 in the third embodiment. For example, $\lambda_{-k}$ represents a correlation between the text to be translated and a $k^{th}$ sentence preceding the text to be translated.

In step B3, the target encoded result is decoded according to the determined correlation degree and the encoded result of the preceding target text.

In the step, calculation may be performed on the correlation coefficients $\{\lambda_{-k}, \lambda_{-k-1}, \ldots, \lambda_{-1}\}$ and the encoded results $\tilde{H}_1^y, \ldots, \tilde{H}_{-k}^y$ (with reference to the step C1 in the second embodiment) of the preceding target text according to the following formula:

$$H_c^y = \lambda_{-k}\tilde{H}_{-k}^y + \ldots + _{-1}\tilde{H}_{-1}^y \quad (5)$$

As shown in FIG. 3, $H_c^y$ represents the encoded result of the preceding target text to be used in decoding. Sequential decoding is performed by the RNN when the target encoded result $H_c$ is decoded. In this disclosure, $H_c^y$ is added at each moment in the process of decoding according to the following calculation formula:

$$s_j = g(Ws_{j-1} + Uy_{j-1} + Vc_j + PH_c^y) \quad (6)$$

where g is a non-linear function, such as sigmoid function or LSTM network; W, U, V may be existing training parameters of decoding network, and P is a newly added training parameter of decoding network in the embodiment; $s_j$ represents a hidden state at a current moment j; $s_{j-1}$ represents a hidden state at the last moment j−1; $y_{j-1}$ is a word vector of an encoded result at the last moment, and c is output information of an attention model, where the attention model may be a network structure in a general encoding-and-decoding structure and use the same decoding and calculation method as in conventional technology.

After the hidden state $s_j$ at the current moment j is obtained by decoding, a probability distribution of translation results of a word under translation at the current moment j is estimated through a soft max function in the general encoding-and-decoding structure. The translation result of the translated word is obtained according to the probability distribution.

In summary, the decoding method according to this embodiment introduces the translation result of the preceding source text, i.e., the preceding target text, at the decoding end and further the information about correlation degrees between the text to be translated and the preceding target text. Thus, the translation result of the text to be translated can be connected with a translation result of preceding text, which not only makes the translation result of the text to be translated more accurate, but also improves the fluency of the entire translated text, that is, the cohesiveness and continuity between sentences of the translated discourse-level text are ensured.

Fifth Embodiment

An apparatus for translating a discourse-level text is introduced in this embodiment, and reference can be made to the above method embodiments for related content.

Figure 7:
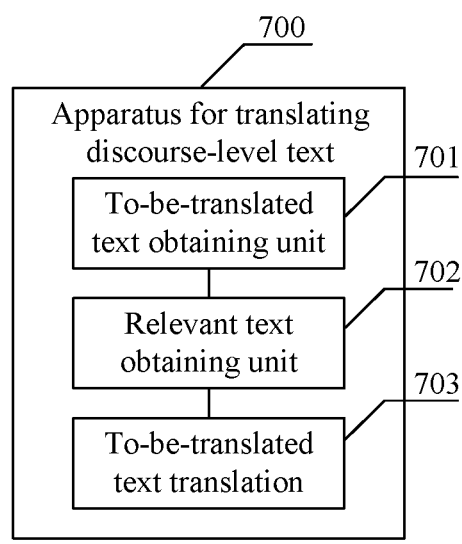
FIG. 7 shows a compositional schematic diagram of an apparatus for translating a discourse-level text according to an embodiment of the present disclosure.

Reference is made to FIG. 7, which shows a compositional schematic diagram of an apparatus for translating a discourse-level text according to this embodiment. The apparatus 700 includes:

a to-be-translated text obtaining unit 701, which is configured to obtain text to be translated, where the text to be translated is unit text in the discourse-level text to be translated;

a relevant text obtaining unit 702, which is configured to obtain relevant text of the text to be translated, where the relevant text includes at least one of preceding source text, succeeding source text and preceding target text, where the preceding source text refers to at least one unit of text before the text to be translated in the discourse-level text, the succeeding source text refers to at least one unit of text after the text to be translated in the discourse-level text, and the preceding target text refers to translated text of the preceding source text; and a to-be-translated text translation unit 703, which is configured to translate the text to be translated according to the relevant text.

In an implementation of the embodiment, the to-be-translated text translation unit 703 may be specifically configured to translate the text to be translated according to the relevant text by using a pre-constructed encoding-and-decoding model.

In an implementation of the embodiment, the to-be-translated text translation unit 703 may include:

a first encoding subunit, which is configured to obtain an initial encoded result by encoding the text to be translated, where the initial encoded result represents semantic information of the text to be translated;

a second encoding subunit, which is configured to obtain a relevant encoded result by encoding the relevant text, where the relevant encoded result represents semantic information of the relevant text;

a result processing subunit, which is configured to obtain a target encoded result by processing the initial encoded result with all or part of encoded results in the relevant encoded result, where the target encoded represents semantic information of the text to be translated and carries all or part of the semantic information of the relevant text; and a decoding implementation subunit, which is configured to translate the text to be translated by decoding the target encoded result.

In an implementation of the embodiment, the first encoding subunit is specifically configured to obtain the initial encoded result by encoding each word of the text to be translated.

Accordingly, the second encoding subunit is specifically configured to encode words of each text unit in the relevant text to obtain encoded results corresponding to respective text units, and determine the encoded results as the relevant encoded result.

In an implementation of the embodiment, the to-be-translated text translation unit 703 may further include:

a first adding subunit, which is configured to add, after the words of the text to be translated are encoded, encoded results of the words of the text to be translated together, to obtain an accumulative result corresponding to the text to be translated; and a second adding subunit, which is configured to, after the words of each text unit in the relevant text are encoded: add, in a case that the relevant text includes the preceding source text, encoded results of words of each unit of text in the preceding source text together, to obtain an accumulative result corresponding to each unit of text; add, in a case that the relevant text includes the succeeding source text, encoded results of words of each unit of text in the succeeding source text together, to obtain an accumulative result corresponding to each unit of text; and add, in a case that the relevant text includes the preceding target text, encoded results of words of each unit of text in the preceding target text together, to obtain an accumulative result corresponding to each unit of text.

In an implementation of the embodiment, the result processing subunit includes:

a first determining subunit, which is configured to determine, in a case that the relevant text includes the preceding source text, an encoded result of the preceding source text from the relevant encoded result;

a second determining subunit, which is configured to determine, in a case that the relevant text includes the succeeding source text, an encoded result of the succeeding source text from the relevant encoded result; and a result obtaining subunit, which is configured to process the initial encoded result according to the determined encoded result to obtain the target encoded result.

In an implementation of the embodiment, the result obtaining subunit includes:

a first correlation degree determining subunit, which is configured to determine, in a case that the relevant text includes the preceding source text, a correlation degree between the text to be translated and the preceding source text according to the initial encoded result of the text to be translated and the encoded result of the preceding source text;

a second correlation degree determining subunit, which is configured to determine, in a case that the relevant text includes the succeeding source text, a correlation degree between the text to be translated and the succeeding source text according to the initial encoded result of the text to be translated and the encoded result of the succeeding source text; and a target result obtaining subunit, which is configured to process the initial encoded result according to the determined encoded result and the determined correlation degree to obtain the target encoded result.

In an implementation of the embodiment, the decoding implementation subunit is specifically configured to decode, in a case that the relevant text includes the preceding target text, the target encoded result by using an encoded result of the preceding target text in the relevant encoded result.

In an implementation of the embodiment, the decoding implementation subunit includes:

a third correlation degree determining subunit, which is configured to determine a correlation degree between the text to be translated and the preceding target text; and an encoded result processing subunit, which is configured to decode the target encoded result according to the determined correlation degree and the encoded result of the preceding target text.

In an implementation of the embodiment, the third correlation degree determining subunit is specifically configured to determine the correlation degree between the text to be translated and the preceding source text as the correlation degree between the text to be translated and the preceding target text.

Sixth Embodiment

Another apparatus for translating a discourse-level text is introduced in this embodiment, and reference can be made to the above method embodiments for related content.

Figure 8:
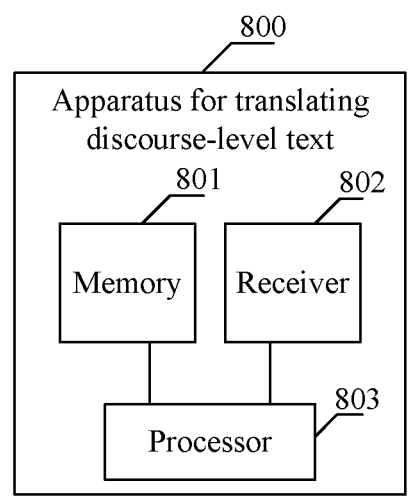
FIG. 8 shows a hardware structural schematic diagram of an apparatus for translating a discourse-level text according to an embodiment of the present disclosure.

Reference is made to FIG. 8, which shows a hardware structural schematic diagram of an apparatus for translating a discourse-level text according to the embodiment. The voice interaction apparatus 800 includes a memory 801, a receiver 802, and a processor 803 connected to the memory 801 and the receiver 802, where the memory 801 is configured to store a set of program instructions, and the processor 803 is configured to call the program instructions stored in the memory 801 to perform the following operations:

obtaining text to be translated, where the text to be translated is unit text in the discourse-level text to be translated;

obtaining relevant text of the text to be translated, where the relevant text includes at least one of preceding source text, succeeding source text, and preceding target text, where the preceding source text refers to at least one unit of text before the text to be translated in the discourse-level text, the succeeding source text refers to at least one unit of text after the text to be translated in the discourse-level text, and the preceding target text refers to translated text of the preceding source text; and translating the text to be translated according to the relevant text.

In an implementation of the embodiment, the processor 803 is configured to call the program instructions stored in the memory 801 to perform the following operation:

translating the text to be translated according to the relevant text by using a pre-constructed encoding-and-decoding model.

In an implementation of the embodiment, the processor 803 is configured to call the program instructions stored in the memory 801 to perform the following operations:

obtaining an initial encoded result by encoding the text to be translated, where the initial encoded result represents semantic information of the text to be translated;

obtaining a relevant encoded result by encoding the relevant text, where the relevant encoded result represents semantic information of the relevant text;

obtaining a target encoded result by processing the initial encoded result with all or part of encoded results in the relevant encoded result, where the target encoded result represents the semantic information of the text to be translated and carries all or part of the semantic information of the relevant text; and translating the text to be translated by decoding the target encoded result.

In an implementation of the embodiment, the processor 803 is configured to call the program instructions stored in the memory 801 to perform the following operations:

obtaining the initial encoded result by encoding words of the text to be translated; and encoding words of each text unit in the relevant text to obtain encoded results corresponding to respective text units, and determining the encoded results as the relevant encoded result.

In an implementation of the embodiment, the processor 803 is configured to call the program instructions stored in the memory 801 to perform the following operations:

obtaining an accumulative result corresponding to the text to be translated by adding encoded results of the words of the text to be translated together;

adding, in a case that the relevant text includes the preceding source text, encoded results of words of each unit of text in the preceding source text together, to obtain an accumulative result corresponding to each unit of text;

adding, in a case that the relevant text includes the succeeding source text, encoded results of words of each unit of text in the succeeding source text together, to obtain an accumulative result corresponding to each unit of text; and adding, in a case that the relevant text includes the preceding target text, encoded results of words of each unit of text in the preceding target text together, to obtain an accumulative result corresponding to each unit of text.

In an implementation of the embodiment, the processor 803 is configured to call the program instructions stored in the memory 801 to perform the following operations:

determining, in a case that the relevant text includes the preceding source text, an encoded result of the preceding source text from the relevant encoded result;

determining, in a case that the relevant text includes the succeeding source text, an encoded result of the succeeding source text from the relevant encoded result; and processing the initial encoded result according to the determined encoded result.

In an implementation of the embodiment, the processor 803 is configured to call the program instructions stored in the memory 801 to perform the following operations:

determining, in a case that the relevant text includes the preceding source text, a correlation degree between the text to be translated and the preceding source text according to the initial encoded result of the text to be translated and the encoded result of the preceding source text;

determining, in a case that the relevant text includes the succeeding source text, a correlation degree between the text to be translated and the succeeding source text according to the initial encoded result of the text to be translated and the encoded result of the succeeding source text; and processing the initial encoded result according to the determined encoded result and the determined correlation degree.

In an implementation of the embodiment, the processor 803 is configured to call the program instructions stored in the memory 801 to perform the following operation:

decoding, in a case that the relevant text includes the preceding target text, the target encoded result by using an encoded result of the preceding target text in the relevant encoded result.

In an implementation of the embodiment, the processor 803 is configured to call the program instructions stored in the memory 801 to perform the following operations:

determining a correlation degree between the text to be translated and the preceding target text; and decoding the target encoded result according to the determined correlation degree and the encoded result of the preceding target text.

In an implementation of the embodiment, the processor 803 is configured to call the program instructions stored in the memory 801 to perform the following operation:

determining the correlation degree between the text to be translated and the preceding source text as the correlation degree between the text to be translated and the preceding target text.

In some embodiments, the processor 803 may be a central processing unit (Central Processing Unit, CPU), the memory 801 may be an internal storage of random access memory (Random Access Memory, RAM) type, and the receiver 802 may include an ordinary physical interface, where the physical interface may be an Ethernet interface or an asynchronous transfer mode (Asynchronous Transfer Mode, ATM) interface. The processor 803, the receiver 802 and the memory 801 may be integrated into one or more independent circuits or pieces of hardware, such as, an application specific integrated circuit (Application Specific Integrated Circuit, ASIC).

A computer-readable storage medium is further provided according to this embodiment. The computer-readable storage medium includes instructions that, when running on a computer, cause the computer to execute any of the above methods for translating a discourse-level text.

A computer program product is further provided according to this embodiment, where the computer program product, when running on a terminal device, causes the terminal device to execute any of the above methods for translating a discourse-level text.

It can be known from the description of the foregoing implementations that those skilled in the art can clearly understand that all or part of the steps in the foregoing methods in the embodiments can be implemented by means of software with a necessary general hardware platform. Based on this understanding, the essential part or the part contributing to the existing technology of the technical solution of this application can be embodied in the form of a software product. The computer software product may be stored in a storage medium, such as ROM/RAM, magnetic disk, optical disc, etc., including several instructions that cause a computer device (which may be a personal computer, a server, or a network communication device such as a media gateway, etc.) to execute the methods in various embodiments or in parts of the various embodiments in this disclosure.

It should be noted that the various embodiments in this specification are described herein in a progressive manner, with the emphasis of each of the embodiments on the difference between it and the other embodiment; hence, one can refer to the other embodiments for the same or similar parts between the various embodiments. The apparatus according to the embodiments is briefly described for it corresponds to the method according to the embodiments, and reference can be made to the description of the method for related parts.

It should be further noted that relationship term such as "the first" and "the second" herein are only used to distinguish one entity or operation from another entity or operation, and does not necessarily require or imply that there is an actual relationship or sequence between these entities or operations. Furthermore, terms "include", "comprise" or any other variations thereof are intended to cover non-exclusive inclusion, so that a process, a method, an object or a device including a series of elements not only include these elements, but also include other elements not explicitly listed or elements inherent to the process, the method, the object or the device. Without more limitation, the statement "include a . . . " preceding an element does not exclude presence of other same elements in the process, the method, the object or the device including the element.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but shall accord with the widest scope consistent with the principle and novel features disclosed herein.

The invention claimed is:

1. A method for translating a discourse-level text, the method comprising:

obtaining text to be translated, wherein the text to be translated is unit text in the discourse-level text to be translated;

dynamically selecting at least one among preceding source text, succeeding source text and preceding target text, according to relevance degrees at which the text to be translated is related to the preceding source text, the succeeding source text, and the preceding target text, to be a relevant text of the text to be translated, wherein the relevance degrees are measured by correlation coefficients of respective sentences in the preceding source text, the succeeding source text, and the preceding target text with respect to the text to be translated, wherein the preceding source text is at least one unit of text before the text to be translated in the discourse-level text, the succeeding source text is at least one unit of text after the text to be translated in the discourse-level text, and the preceding target text is translated text of the preceding source text; and translating the text to be translated according to the relevant text.

2. The method according to claim 1, wherein translating the text to be translated according to the relevant text comprises:

translating the text to be translated according to the relevant text by using a pre-constructed encoding-and-decoding model.

3. The method according to claim 2, wherein translating the text to be translated according to the relevant text comprises:

obtaining an initial encoded result by encoding the text to be translated, wherein the initial encoded result represents semantic information of the text to be translated;

obtaining a relevant encoded result by encoding the relevant text, wherein the relevant encoded result represents semantic information of the relevant text;

obtaining a target encoded result by processing the initial encoded result with all or part of encoded results in the relevant encoded result, wherein the target encoded result represents the semantic information of the text to be translated and carries all or part of the semantic information of the relevant text; and translating the text to be translated by decoding the target encoded result.

4. The method according to claim 3, wherein obtaining the initial encoded result by encoding the text to be translated comprises:
obtaining the initial encoded result by encoding words of the text to be translated,
wherein correspondingly, obtaining the relevant encoded result by encoding the relevant text comprises:
encoding words of each text unit in the relevant text to obtain encoded results corresponding to respective text units, and determining the encoded results as the relevant encoded result.

5. The method according to claim 4, wherein after encoding the words of the text to be translated, the method further comprises:
obtaining an accumulative result corresponding to the text to be translated by adding encoded results of the words of the text to be translated together, wherein correspondingly, after encoding the words of each text unit in the relevant text, the method further comprises:
adding, in a case that the relevant text comprises the preceding source text, encoded results of words of each unit of text in the preceding source text together, to obtain an accumulative result corresponding to each unit of text;
adding, in a case that the relevant text comprises the succeeding source text, encoded results of words of each unit of text in the succeeding source text together, to obtain an accumulative result corresponding to each unit of text; and
adding, in a case that the relevant text comprises the preceding target text, encoded results of words of each unit of text in the preceding target text together, to obtain an accumulative result corresponding to each unit of text.

6. The method according to claim 3, wherein processing the initial encoded result with all or part of the encoded results in the relevant encoded result comprises:
determining, in a case that the relevant text comprises the preceding source text, an encoded result of the preceding source text from the relevant encoded result;
determining, in a case that the relevant text comprises the succeeding source text, an encoded result of the succeeding source text from the relevant encoded result; and
processing the initial encoded result according to the determined encoded result.

7. The method according to claim 6, wherein processing the initial encoded result according to the determined encoded result comprises:
determining, in a case that the relevant text comprises the preceding source text, a correlation degree between the text to be translated and the preceding source text according to the initial encoded result of the text to be translated and the encoded result of the preceding source text;
determining, in a case that the relevant text comprises the succeeding source text, a correlation degree between the text to be translated and the succeeding source text according to the initial encoded result of the text to be translated and the encoded result of the succeeding source text; and
processing the initial encoded result according to the determined encoded result and the determined correlation degree.

8. The method according to claim 3, wherein translating the text to be translated by decoding the target encoded result comprises:
decoding, in a case that the relevant text comprises the preceding target text, the target encoded result by using an encoded result of the preceding target text in the relevant encoded result.

9. The method according to claim 8, wherein decoding the target encoded result by using the encoded result of the preceding target text in the relevant encoded result comprises:
determining a correlation degree between the text to be translated and the preceding target text; and
decoding the target encoded result according to the determined correlation degree and the encoded result of the preceding target text.

10. The method according to claim 9, wherein determining the correlation degree between the text to be translated and the preceding target text comprises:
determining the correlation degree between the text to be translated and the preceding source text as the correlation degree between the text to be translated and the preceding target text.

11. The method according to claim 2, further comprising introducing, for each word in the text to be translated, a relevance degree at which the text to be translated is related to the relevant text when translating the text to be translated.

12. An apparatus for translating a discourse-level text, the apparatus comprising:
a processor, a memory, and a system bus,
wherein, the processor and the memory are connected with each other by the system bus,
and the memory is configured to store one or more computer programs, the one or more computer programs comprising instructions that, when executed by the processor, cause the processor to execute the method according to claim 1.

13. A non-transient computer-readable storage medium, comprising instructions that, when running on a computer, cause the computer to execute the method according to claim 1.

14. An apparatus for translating a discourse-level text, the apparatus comprising:
a to-be-translated text obtaining unit, configured to obtain text to be translated, wherein the text to be translated is unit text in the discourse-level text to be translated;
a relevant text obtaining unit, configured to dynamically selecting at least one among preceding source text, succeeding source text and preceding target text, according to relevance degrees at which the text to be translated is related to the preceding source text, the succeeding source text, and the preceding target text, to be a relevant text of the text to be translated, wherein the relevance degrees are measured by correlation coefficients of respective sentences in the preceding source text, the succeeding source text, and the preceding target text with respect to the text to be translated, and wherein the preceding source text is at least one unit of text before the text to be translated in the discourse-level text, the succeeding source text is at least one unit of text after the text to be translated in the discourse-level text, and the preceding target text is translated text of the preceding source text; and
a to-be-translated text translation unit, configured to translate the text to be translated according to the relevant text.

15. The apparatus according to claim 14, wherein the to-be-translated text translation unit is configured to translate the text to be translated according to the relevant text by using a pre-constructed encoding-and-decoding model.

16. The apparatus according to claim 15, wherein the to-be-translated text translation unit comprises:
- a first encoding subunit, configured to obtain an initial encoded result by encoding the text to be translated, wherein the initial encoded result represents semantic information of the text to be translated;
- a second encoding subunit, configured to obtain a relevant encoded result by encoding the relevant text, wherein the relevant encoded result represents semantic information of the relevant text;
- a result processing subunit, configured to obtain a target encoded result by processing the initial encoded result with all or part of encoded results in the relevant encoded result, wherein the target encoded result represents the semantic information of the text to be translated and carries all or part of the semantic information of the relevant text; and
- a decoding implementation subunit, configured to translate the text to be translated by decoding the target encoded result.

17. The apparatus according to claim 16, wherein the decoding implementation subunit is configured to decode, in a case that the relevant text comprises the preceding target text, the target encoded result by using an encoded result of the preceding target text in the relevant encoded result.

18. The apparatus according to claim 15, wherein the to-be-translated text translation unit is further configured to introduce, for each word in the text to be translated, a relevance degree at which the text to be translated is related to the relevant text when translating the text to be translated.

* * * * *